United States Patent
Silk et al.

(10) Patent No.: US 8,472,390 B2
(45) Date of Patent: Jun. 25, 2013

(54) METHOD AND APPARATUS FOR ALLOCATING SPECTRUM

(75) Inventors: S. David Silk, Barrington, IL (US); Steven F. Gillig, Roselle, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 658 days.

(21) Appl. No.: 12/710,490

(22) Filed: Feb. 23, 2010

(65) Prior Publication Data
US 2011/0205979 A1    Aug. 25, 2011

(51) Int. Cl.
*H04W 24/00*    (2009.01)
(52) U.S. Cl.
USPC .......................................................... 370/329
(58) Field of Classification Search
USPC .......................................................... 370/329
See application file for complete search history.

(56) References Cited

U.S. PATENT DOCUMENTS

| | | |
|---|---|---|
| 2007/0097943 A1 | 5/2007 | Lange |
| 2007/0242769 A1 | 10/2007 | Yang |
| 2007/0249361 A1* | 10/2007 | Klang et al. ............... 455/452.2 |
| 2008/0070586 A1 | 3/2008 | Kermoal et al. |

FOREIGN PATENT DOCUMENTS

| | | |
|---|---|---|
| EP | 1 494 490 A1 | 1/2005 |
| GB | 2 436 418 A | 9/2007 |
| WO | WO 97/48194 A1 | 12/1997 |

* cited by examiner

*Primary Examiner* — Melvin Marcelo
(74) *Attorney, Agent, or Firm* — Steven A. May

(57) ABSTRACT

A method and apparatus for allocating spectrum within a wireless communication system is provided herein. During operation, a first base station will determine a location of a UE wishing to transmit. A database will be accessed containing wireless coverage area information for base stations with overlapping coverage with the first base station. Based on this information the first base station will determine if the UE is within an overlapping coverage area of multiple base stations. Spectrum will be assigned to the wireless equipment in a guard band, based at least in part on the determination that the UE is not within the overlapping coverage area.

15 Claims, 4 Drawing Sheets

METHOD AND APPARATUS FOR ALLOCATING SPECTRUM

FIELD OF THE INVENTION

The present invention relates generally to wireless communication systems and in particular, to a method and apparatus for allocating spectrum in wireless communication systems.

BACKGROUND OF THE INVENTION

In a typical communication system, multiple base stations may be utilized to serve many remote units. The coverage area of each base station usually overlaps the coverage area of other base stations in order to give complete coverage of a geographic area. In a typical scenario, communication to and from each base station will be allowed within a particular frequency band. The frequency bands of co-located base stations typically do not overlap. This is illustrated in FIG. 1.

As shown in FIG. 1, base stations 101, 102, and 103 each serve coverage areas 104, 105, and 106, respectively. As is evident, the coverage areas overlap somewhat (shaded area). In typical network planning, each base station 101, 102, 103 will be given a frequency band for all uplink communications from user equipment (UE). In FIG. 1, base station 101, 102, and 103 are given frequency bands 107, 108, and 109, respectively.

When frequency bands for co-located base stations are adjacent in frequency, spectrum at the band edges is reserved for use as a guard band to mitigate interference between adjacent spectrum band users that may also be co-located in the same geographic region. This is illustrated in FIG. 2 as guard bands 201. Furthermore, guard bands may be enlarged to compensate for worse case operating conditions, such as a UE simultaneously attempting to receive while in close proximity to other UE operating in an adjacent spectrum band attempting to transmit.

Typically, no transmissions are allowed to take place within a guard band. Because of this, the amount of spectrum being used is greatly reduced. It would be beneficial if somehow this spectrum were able to be utilized for communications. Therefore a need exists for a method and apparatus for allocating spectrum in wireless communication systems that allows for communications to take place within guard bands, yet does not cause interference within co-located base stations operating in adjacent spectrum.

Figure 1:
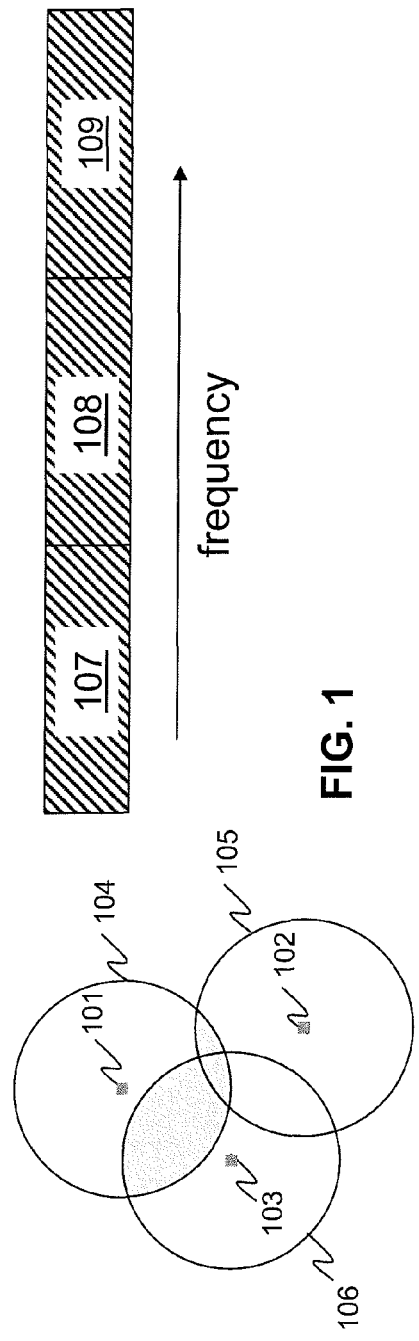
FIG. 1 is a block diagram showing a typical communication system.
Figure 2:
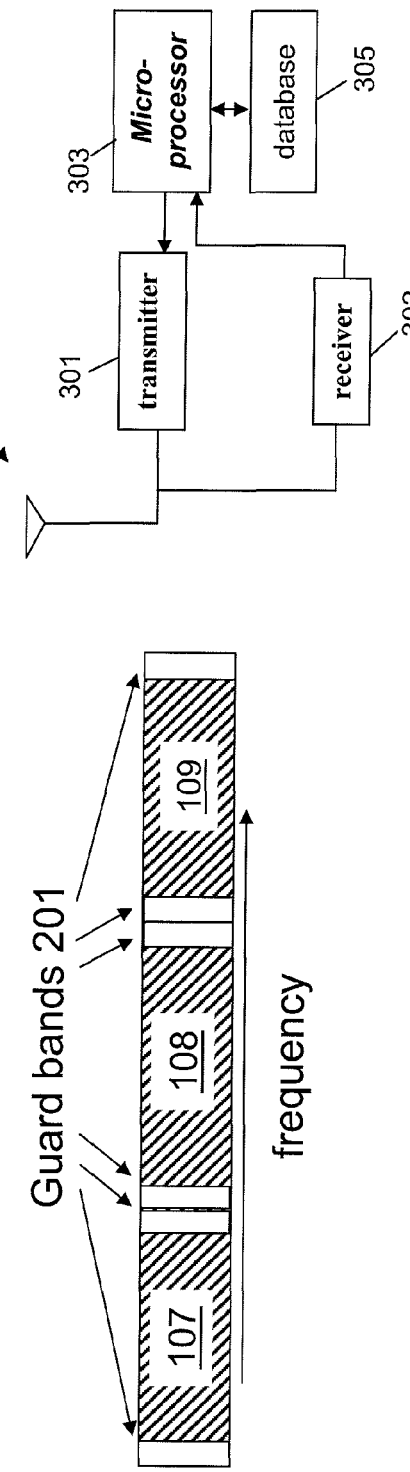
FIG. 2 illustrates the use of guard bands.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for allocating spectrum within a wireless communication system is provided herein. During operation, a first base station will determine a location of a user equipment (UE) wishing to transmit. A database will be accessed containing wireless coverage area information for base stations with overlapping coverage with the first base station. Based on this information the first base station will determine if the UE is within an overlapping coverage area of multiple base stations. Spectrum will be assigned to the UE in a guard band, based at least in part on the determination that the UE is not within the overlapping coverage area.

The above-described technique exploits geographic location and coverage information to dynamically reallocate spectrum in a guard band. In doing so, the above technique can improve the spectral efficiency of a deployed system, enable more UE to be serviced, and ultimately create more economic value and/or revenue opportunity provided that the same level of mitigating interference is maintained as when the guard band is not adapted.

The present invention encompasses a method for allocating spectrum by a first base station having an overlapping coverage area with a second base station and having adjacent spectrum with the second base station. The method comprises the steps of determining by the first base station, a location of user equipment in communication with the first base station, accessing by the first base station a database containing information on the overlapping coverage areas, and determining by the first base station if the location of the user equipment is within an overlapping coverage area of the second base station. A spectrum resource is assigned to the user equipment in a guard band at frequencies adjacent to a band edge of frequencies used by the second base station based on whether or not the location of the user equipment lies within an overlapping coverage area.

The present invention additionally encompasses a method for allocating spectrum to a first base station having an overlapping coverage area with a second base station and having adjacent spectrum with the second base station. The method comprises the steps of accessing by the first base station a database containing information on the overlapping coverage areas, determining by the first base station, a location of user equipment in communication with the first base station, and determining by the first base station if the location of the user equipment is located within an overlapping coverage area of the second base station. A spectrum resource is assigned to the user equipment within frequencies adjacent to a band edge of frequencies used by the second communication system when the location of the user equipment does not lie within an overlapping coverage area, otherwise assigning the spectrum resource to the user not adjacent to the band edge of frequencies.

Finally, the present invention encompasses an apparatus for allocating transmit spectrum by a first base station having an overlapping coverage area and adjacent spectrum with a second base station. The apparatus comprises logic circuitry accessing a database containing information on the overlapping coverage areas, the logic circuitry determining a location of user equipment in communication with the first base station, determining if the location of the user equipment lies within the overlapping coverage area of the second base station, and assigning spectrum to the user equipment in a guard band at frequencies adjacent to a band edge of frequencies used by the second communication system based on whether or not the location of the user equipment lies within the overlapping coverage area.

Figure 3:
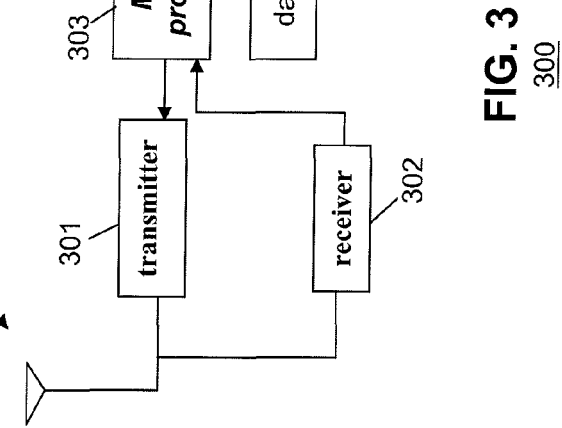
FIG. 3. is a block diagram of a base stations.

FIG. 3 is a block diagram showing base station 300. As shown, base station 300 (sometimes referred to as an access point) comprises database 305, logic circuitry 303 (microprocessor 303), receive circuitry 302, and transmit circuitry 301. In an alternate embodiment of the present invention, database 305 may lie external to base station 300. Logic circuitry 303 preferably comprises a microprocessor controller, such as, but not limited to a Freescale PowerPC microprocessor. In the preferred embodiment of the present invention logic circuitry 303 serves as means for determining a location for UEs, and as means for assigning a particular frequency for uplink transmissions. Database 305 comprises standard random access memory and is used to store information related to coverage areas of co-located base stations and temporary locations for UEs. Finally receive and transmit circuitry are common circuitry known in the art for communication utilizing a well known communication protocol, and serve as means for transmitting and receiving messages. For example, receiver 302 and transmitter 301 are well known circuits that utilize a common cellular communication system protocol such as GSM communication system protocol. Other possible transmitters and receivers include, but are not limited to transceivers utilizing IEEE 802.11, IEEE 802.16, or HyperLAN protocols.

Base station 300 provides a means to dynamically allocate spectrum at the band edges that is traditionally reserved for use as a fixed guard band. During operation logic circuitry 303 can access database 305 comprising critical information about adjacent spectrum band users co-located in a geographic region. This information typically comprises a geographic area where overlapping coverage between base stations exists. From information contained in the database, overlapping coverage between any co-located base stations operating in the geographic region and within adjacent spectrum bands can be ascertained. Within this area, any transmission by a UE, utilizing a frequency currently being used by an adjacent base station, or a UE in communication with the adjacent base station, may cause interference. Hence, logic circuitry 303 can build a "dynamic interference map" identifying regions where the potential for interference is highest. Database 305 may also include historical data that describes regions where interference is likely and may in part be due to other RF propagation phenomenon, such as multipath or specular distortion that may also be independent of the overlap regions.

Figures 4, 5:
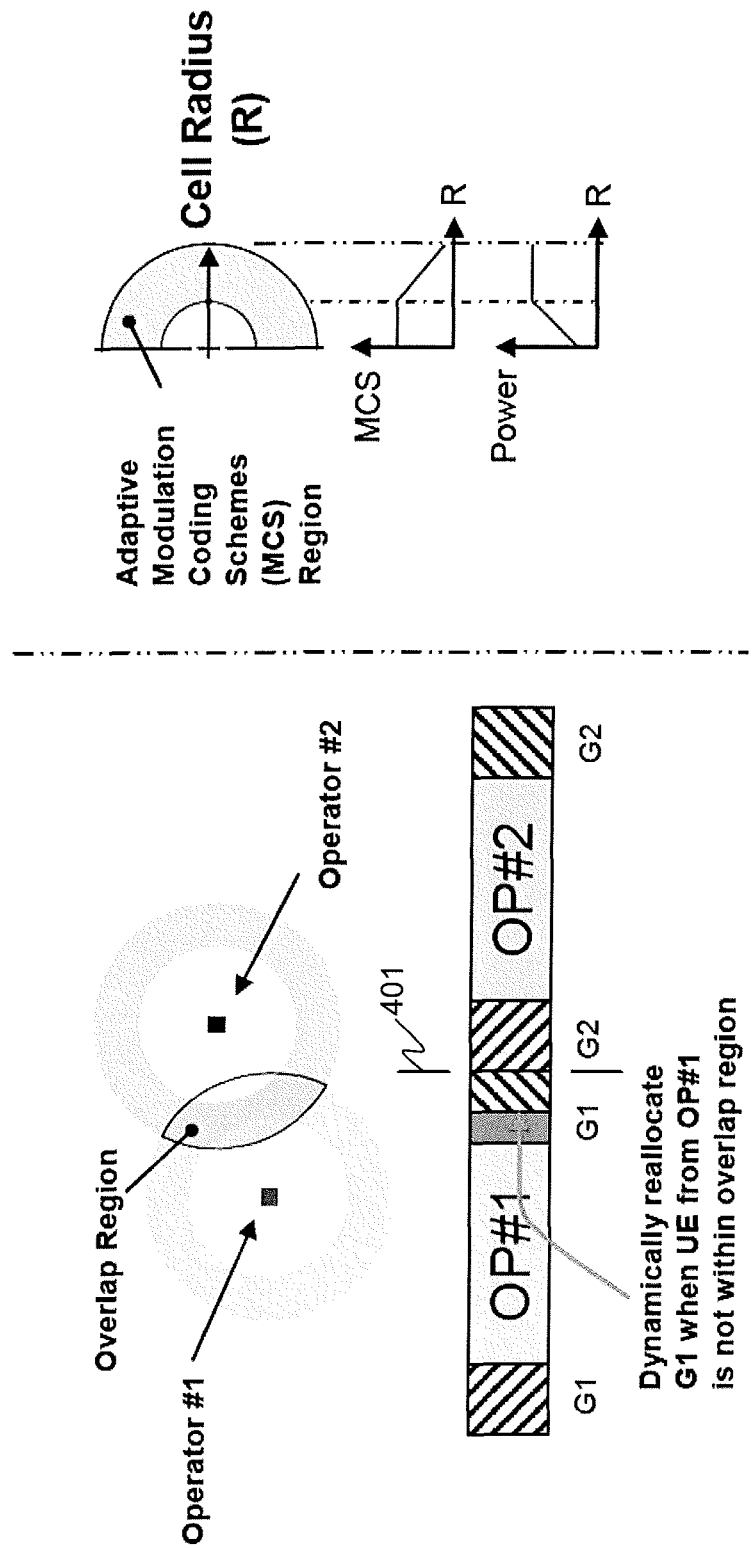
FIG. 4 illustrates overlapping coverage areas.
FIG. 5 illustrates that most broadband wireless systems typically employ two concentric regions within the coverage of a single base station site.

FIG. 4 illustrates the above procedure. With respect to Operator #1, if an associated UE resides within the overlap region, the guard band can not be reallocated for that particular UE because any uplink transmission may create harmful interference to the UE used by Operator #2. However, if a UE associated with Operator #1 is outside the overlap region, the UE potentially can be allocated spectrum from within the guard band. Allocation depends on the separation distance from the overlap region (as determined by critical parameters such as path loss and link budget relative to the noise floor). Hence, the greater the separation in distance between the UE and the overlap region the greater the potential to allocate more spectrum within the guard band for use by the UE. In a preferred embodiment of the present invention, as a UE moves farther and farther from the overlapping region, frequencies assigned to the UE can be assigned closer and closer to band edge 401 existing between the two operators. Thus, the spectral efficiency of the system, overall capacity, and ultimately the number of serviced UEs can be increased.

FIG. 5 illustrates that most broadband wireless systems typically employ two concentric regions within the coverage of a single base station site. For the desired quality of service to be maintained, UE transmit power and modulation encoding schemes are varied to maintain the required link budget. When a UE resides within the interior concentric region, the UE is required to reduce transmit power proportionally to a reduction in separation distance between the base station and the UE and maintains a constant modulation coding scheme. But the inverse is true for the exterior concentric region. When a UE resides within the exterior concentric region, the UE is required to maintain an increased (yet constant) transmit power and reduce the modulation coding scheme proportionally to an increase in separation distance between the base station and the UE. This increase in power has the potential to interfere with uplink transmissions of co-located base stations.

Figure 6:
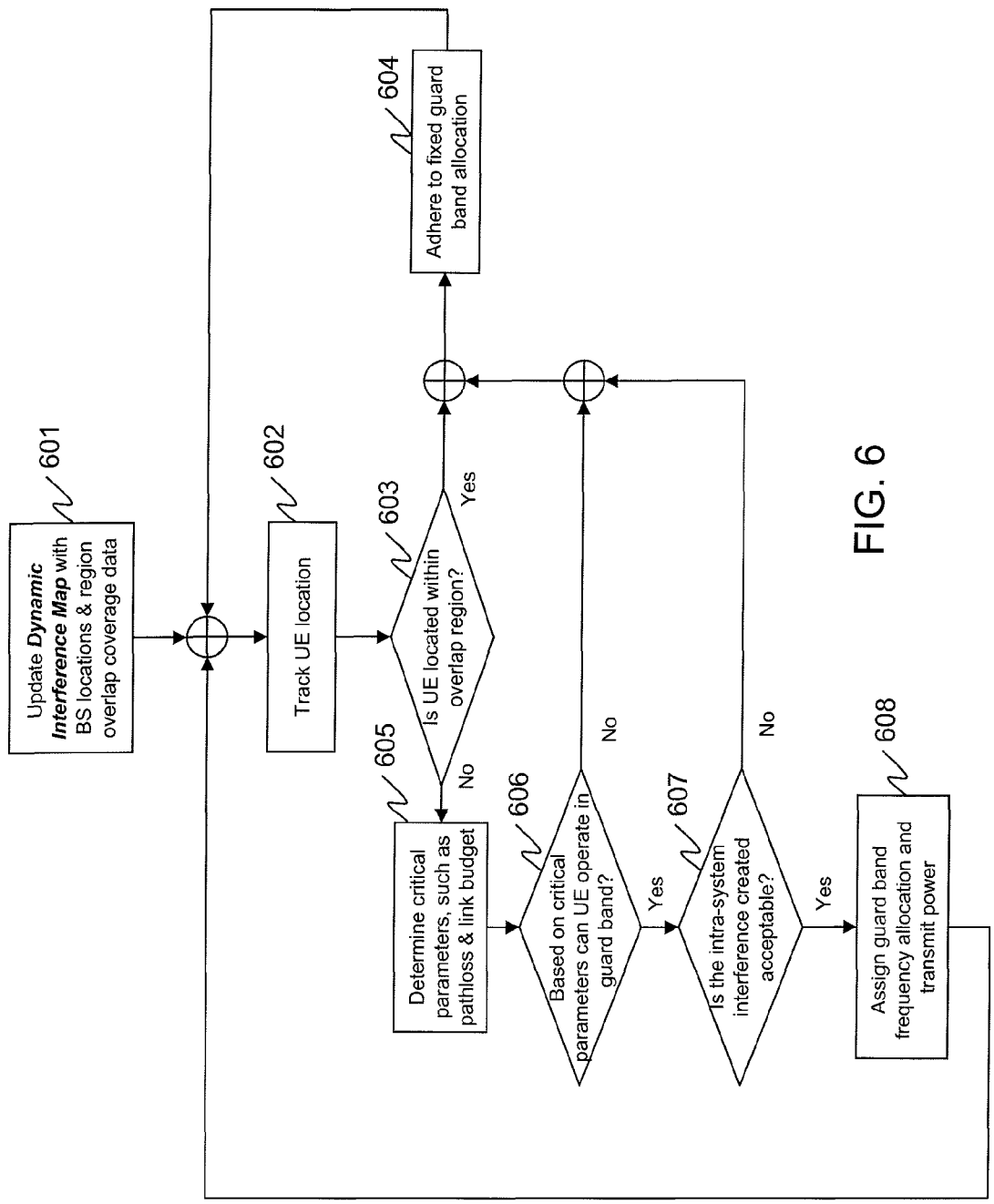
FIG. 6 is a flow chart showing the operation of the base stations of FIG. 3.

FIG. 6 is a flow chart showing the operation of the base station of FIG. 3. It is assumed that at least two adjacent base stations discussed in FIG. 6 utilize adjacent frequency bands for uplink communication. If no base station utilized adjacent uplink frequency bands, then there would be no reason to prevent transmissions near band edges, since uplink interference would be uncommon.

The logic flow begins at step 601 where database 305 is populated with locations of overlapping base station coverage areas along with uplink frequency bands utilized by neighboring base stations. In one embodiment of the present invention, database 305 is only populated with overlapping coverage areas for base stations having adjacent uplink frequency bands of operation. Both embodiments result in database 305 containing essentially an interference map for the region around base station 300.

The creation of database 305 may be done dynamically via microprocessor 303 periodically receiving the interference information, or may be done once during the installation/deployment of base station 300. Furthermore, elements of the database do not have to be centralized in a common repository but may also be decentralized and stored at each base station should latency to access the required information be critical.

At step 602 locations for UEs in communication with the base station 300 are determined by logic circuitry 303. In a preferred embodiment, each UE is equipped with the means to determine its location. The location means preferably comprises a Global Positioning System (GPS) receiver. Locations for UE are periodically transmitted to base station 300, received by receiver 302, and provided to microprocessor

303. This information is preferably received from each individual UE, and may be stored in database 305.

At step 603, logic circuitry 303 accesses database 305 to determine if a UE is located within an overlap region of a second base station (i.e., coverage overlap between base station 300 and a co-located base station). If so, the logic flow continues to step 604 where the particular UE will not be allowed to communicate within a guard band (i.e., frequencies adjacent to the band edge) and frequency allocation (assignment of spectrum) outside of the guard band will take place.

If, however, a UE is located outside of the overlap region, the logic flow continues to step 605 where certain transmit parameters are determined by logic circuitry 303. Preferably these transmit parameters comprise parameters such as, but not limited to path loss, transmit power, and utilized bandwidth. At step 606 these parameters are used to determine by logic circuitry 303 if the UE can operate in the guard band and still have acceptable performance at a neighboring base station. For example, a neighboring base station may want added insurance that interference will not take place if a UE is operating near, yet outside an overlapping region. In this situation, the logic flow returns to step 604 and the UE is not allowed to operate within the guard band, otherwise the logic flow continues to step 607.

If it is determined at step 606 that the UE may operate within a guard band, the UE may still not be allowed to do so if doing so will cause added interference to the base station 300. For example, there may be many users already occupying the guard band. Thus, at step 607 it is determined if intra-system interference created by operating within the guard band will be acceptable (i.e., determining if assigning the user equipment to the guard band will cause interference to the first base station). If not, the logic flow returns to step 604, otherwise the logic flow continues to step 608 where logic circuitry 303 assigns a frequency (spectrum resource) within the guard band to the UE.

As is evident assigning logic circuitry 303 will assign a spectrum resource to the user equipment within frequencies adjacent to a band edge of frequencies used by the second communication system when the location of the user equipment does not lie within an overlapping coverage area, otherwise the spectrum resource will be assigned to the user at a frequency not adjacent to the band edge.

If one refers to a group of frequencies existing at the band edges of adjacent frequency bands as a guard band, then the result of the above logic flow may be thought of as assigning resource to the user equipment in a guard band at frequencies adjacent to a band edge of frequencies used by the second communication system. This assignment is based on whether or not the location of the user equipment lies within an overlapping coverage area. More particularly, the guard band will be utilized when the assignment will not cause interference to the first base station, and the assignment will not cause interference to the second base station. When the guard band cannot be utilized, frequencies outside the guard band are assigned to UEs.

Figure 7:
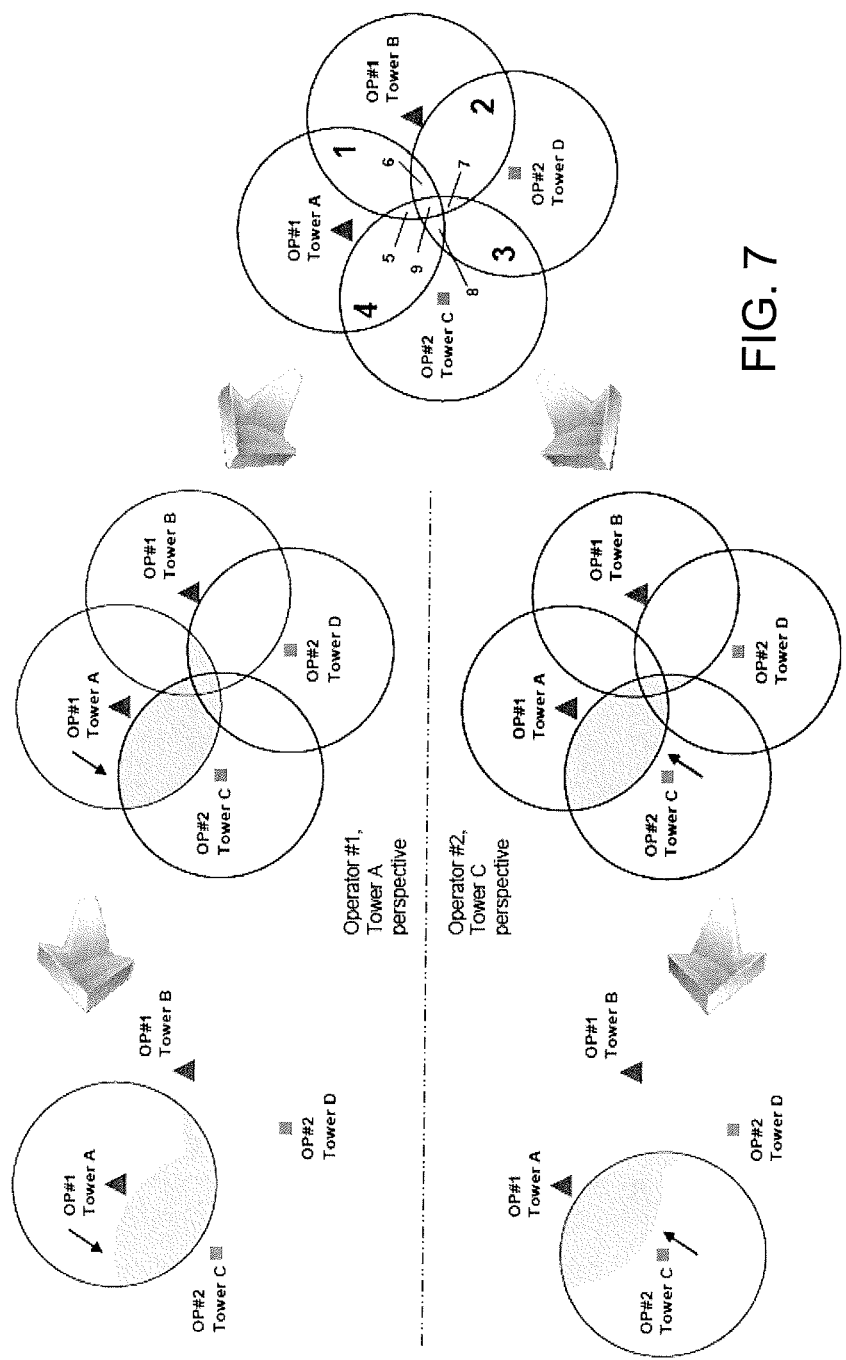
FIG. 7 illustrates the fact that the interference environment is perceived differently from the vantage point of each base station.

It is interesting to note that the interference environment is perceived differently from the vantage point of each base station. Refer to FIG. 7 for a simple depiction. Shown in FIG. 7 are all of the overlap regions between four example base stations associated with two different operators. As perceived by each base station, each base station can develop a unique view of the overlap regions or regions of interest where interference is likely. For example, from the perspective of Operator #1, for Tower A the region of interest with respect to all neighboring Operator #2 base stations is:

Tower A Region of Interest=Region 4+Region 5+Region 6+Region 8+Region 9
Conversely, from the perspective of Operator #2, for Tower C the region of interest with respect to all neighboring Operator #1 base stations is:
Tower C Region of Interest=Region 4+Region 5+Region 7+Region 8+Region 9

As is evident the interference environment is perceived differently from the vantage point of each base station.

While the invention has been particularly shown and described with reference to a particular embodiment, it will be understood by those skilled in the art that various changes in form and details may be made therein without departing from the spirit and scope of the invention. For example, in the above discussion, a base station can also operate within a guard band based on the locations of other wireless access devices including access points that operating in unlicensed frequencies (WiFi) and licensed frequencies (cellular femtocells). Furthermore, in the discussion of the invention, a guard band is described as predetermined and spectrum is advantageously assigned in the guard band. However, the invention can just as well be applied to the situation in which the guard band is not predetermined and is created explicitly for the overlap region by virtue of reallocating spectrum from the normal spectrum allocations. It is intended that such changes come within the scope of the following claims:

1. A method for allocating spectrum by a first base station having an overlapping coverage area with a second base station and having adjacent spectrum with the second base station, the method comprising the steps of:
  determining by the first base station, a location of user equipment in communication with the first base station;
  accessing by the first base station a database containing information on the overlapping coverage areas;
  determining by the first base station if the location of the user equipment is within an overlapping coverage area of the second base station; and
  assigning a spectrum resource to the user equipment in a guard band at frequencies adjacent to a band edge of frequencies used by the second base station based on whether or not the location of the user equipment lies within an overlapping coverage area.

2. The method of claim 1 further comprising the steps of:
  determining if assigning the user equipment to the guard band will cause interference to the first base station; and
  assigning the spectrum resource to the user equipment if the assignment will not cause interference to the first base station.

3. The method of claim 1 wherein the first base station and the second base station utilize a first and a second frequency band that are adjacent in frequency.

4. The method of claim 1 wherein the step of determining the location comprises the step of receiving the location from the user equipment.

5. The method of claim 1 further comprising the steps of:
  determining a path loss and link budget for the user equipment; and
  assigning the spectrum resource to the user equipment within the guard band only if the path loss and link budget are such that communication within the guard band will not cause interference to the second base station.

6. A method for allocating spectrum to a first base station having an overlapping coverage area with a second base station and having adjacent spectrum with the second base station, the method comprising the steps of:

accessing by the first base station a database containing information on the overlapping coverage areas;

determining by the first base station, a location of user equipment in communication with the first base station;

determining by the first base station if the location of the user equipment is located within an overlapping coverage area of the second base station; and assigning a spectrum resource to the user equipment within frequencies adjacent to a band edge of frequencies used by the second communication system when the location of the user equipment does not lie within an overlapping coverage area, otherwise assigning the spectrum resource to the user not adjacent to the band edge of frequencies.

7. The method of claim 6 further comprising the steps of:

determining if assigning the spectrum resource within frequencies adjacent to the band edge will cause interference to the first base station; and assigning the spectrum resource within frequencies adjacent to the band edge if the assignment will not cause interference to the first base station.

8. The method of claim 6 wherein the first base station and the second base station utilize a first and a second frequency band that are adjacent in frequency.

9. The method of claim 6 wherein the step of determining the location comprises the step of receiving the location from the user equipment.

10. The method of claim 6 further comprising the steps of:

determining a path loss and link budget for the user equipment; and assigning the spectrum resource within frequencies adjacent to the band edge only if the path loss and link budget are such that communication will not cause interference to the second base station.

11. An apparatus for allocating transmit spectrum by a first base station having an overlapping coverage area and adjacent spectrum with a second base station, the apparatus comprising:

logic circuitry accessing a database containing information on the overlapping coverage areas, the logic circuitry determining a location of user equipment in communication with the first base station, determining if the location of the user equipment lies within the overlapping coverage area of the second base station, and assigning spectrum to the user equipment in a guard band at frequencies adjacent to a band edge of frequencies used by the second base station based on whether or not the location of the user equipment lies within the overlapping coverage area.

12. The apparatus of claim 11 the logic circuitry determines if assigning the user equipment to the guard band will cause interference to the first base station and assigns the spectrum resource to the user equipment if the assignment will not cause interference to the first base station.

13. The apparatus of claim 11 wherein the first base station and the second base station utilize a first and a second frequency band that are adjacent in frequency.

14. The apparatus of claim 11 wherein the logic circuitry determines the location of the user equipment receiving the location from the user equipment.

15. The apparatus of claim 11 wherein the logic circuitry determines a path loss and link budget for the user equipment and assigns the spectrum resource to the user equipment within the guard band only if the path loss and link budget are such that communication within the guard band will not cause interference to the second base station.

\* \* \* \* \*